US008467415B2

(12) United States Patent  (10) Patent No.: US 8,467,415 B2
Antonelli et al.  (45) Date of Patent: Jun. 18, 2013

(54) SYSTEM AND METHOD FOR DYNAMIC TEMPLATE UPDATING FOR COMPRESSED MESSAGES

(76) Inventors: Michelle M. Antonelli, Barrington, IL (US); Michael F. Korus, Eden Prairie, MN (US)

( * ) Notice: Subject to any disclaimer, the term of this patent is extended or adjusted under 35 U.S.C. 154(b) by 355 days.

(21) Appl. No.: 12/983,117

(22) Filed: Dec. 31, 2010

(65) Prior Publication Data

US 2012/0170571 A1  Jul. 5, 2012

(51) Int. Cl.
*H04J 3/18* (2006.01)
(52) U.S. Cl.
USPC .......................................................... 370/477
(58) Field of Classification Search
None
See application file for complete search history.

(56) References Cited

U.S. PATENT DOCUMENTS

| | | | |
|---|---|---|---|
| 6,976,081 B2 | 12/2005 | Worger et al. | |
| 2002/0057716 A1* | 5/2002 | Svanbro et al. | 370/477 |
| 2003/0145115 A1* | 7/2003 | Worger et al. | 709/247 |
| 2008/0117906 A1* | 5/2008 | Xie | 370/392 |
| 2008/0240226 A1* | 10/2008 | Okmianski et al. | 375/240 |
| 2008/0267219 A1 | 10/2008 | Christoffersson et al. | |

FOREIGN PATENT DOCUMENTS

WO 2009012462 A1 1/2009

OTHER PUBLICATIONS

Andrea G. Forte, et al. Template-Based Signaling Compressioon for Push-To-Talk Over Cellular (PoC); Jul. 2, 2008; 12 Pages.
R. Price, et al. Signaling Compression (SIGCOMP); RFC 3320; Jan. 2003; 62 Pages.

* cited by examiner

*Primary Examiner* — Chirag Shah
*Assistant Examiner* — Amar Persaud

(57) ABSTRACT

A method for updating a message template based on receiving a plurality of common deltas. At a first device, the method detects a first compressed message that includes a first delta and that references a first message template and stores an indication of having received the first delta. The first delta is combinable with the first message template to reconstruct a decompressed message. The first device receives at least one subsequent compressed message that includes the first delta and that references the first message template, and stores an indication of each subsequent time the first delta is received. Based on the stored indications, the first device determines that the first delta was received in accordance with at least one predetermined threshold factor, and in response thereto, initiating a procedure to generate a superseding message template, which updates the first message template by including the first delta.

20 Claims, 8 Drawing Sheets

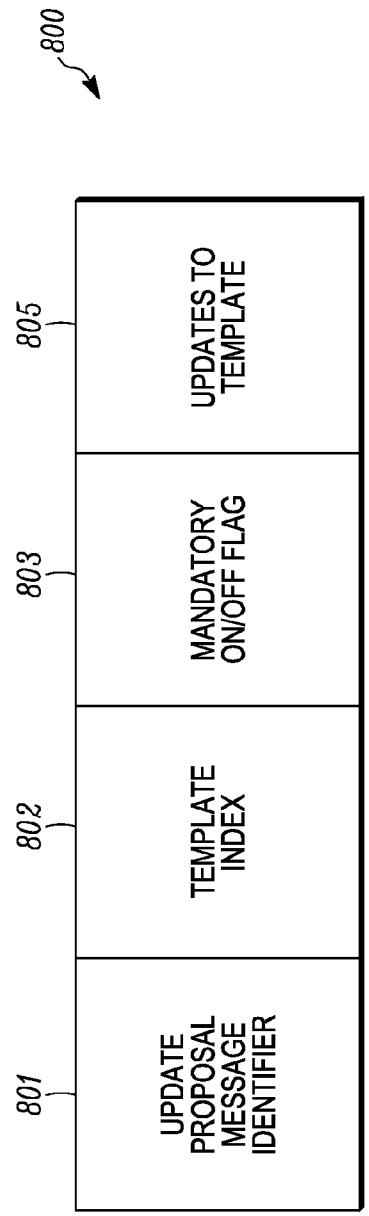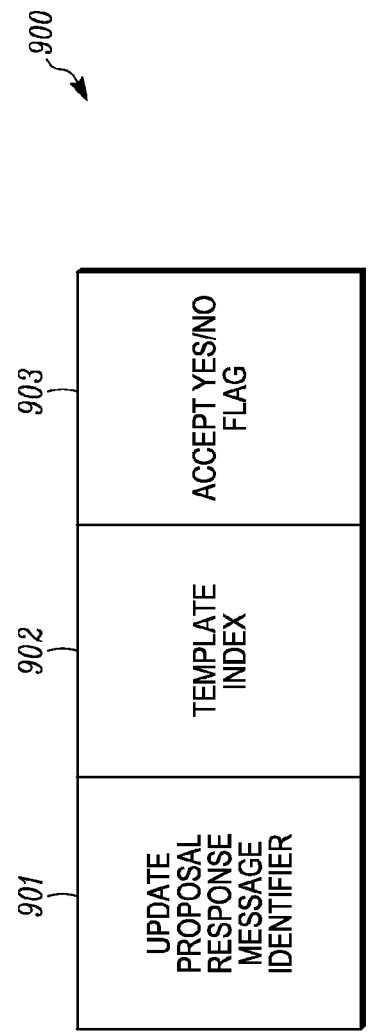
FIG. 8
FIG. 9

SYSTEM AND METHOD FOR DYNAMIC TEMPLATE UPDATING FOR COMPRESSED MESSAGES

TECHNICAL FIELD

The present disclosure relates generally to communication systems and in particular to a system and method for dynamically updating templates for compressed messages, such as for Session Internet Protocol request messages.

BACKGROUND

Recently, as trends in telecommunications rapidly move toward higher speed broadband operations, the variety of and speed by which features offered by mobile telecommunication devices continues to significantly improve. Despite inherently limited processing power and data storage, the demands placed on today's mobile devices often require total performance with minimal latency while establishing multimedia communications sessions, instant messaging, file transfer, and push-to-talk (PTT) sessions for law enforcement and public safety applications among others. Often with extremely large and detailed call session information, the broadband protocols for messaging were historically designed for desktop systems with greater processing, data storage, and bandwidth capabilities than their wireless counterparts, resulting in awkwardly inefficient use of wireless resources and degraded performance overall.

Illustratively, among other messaging applications, mobile devices and other telecommunications systems are increasingly relying on internet protocols such as Session Initiation Protocol (SIP) for creating, modifying, and terminating communication sessions with one or more participants using a combination of multimedia applications, such as for voice and video. Unfortunately, as compared to over-the-air signaling messages that are used and designed primarily for mobile devices, current SIP request messages often have numerous large headers and large Session Description Protocol (SDP) bodies that carry detailed session information that consume significant RF resources, which negatively impacts the performance of real time applications, such as voice PTT. See generally, Internet Engineering Task Force (IETF) protocol RFC 4566 (Session Description Protocol) and RFC3261 (Session Initiation Protocol). Because these SIP messages commonly include SDP bodies that are relatively large, typically 2000 bytes or more, transferring SIP request messages over links with limited bandwidth such as wireless links is unacceptably slow as the problem intensifies with increasing traffic.

Current template compression techniques considerably reduce the size of SIP messages and ultimately reduce the time to build up, tear down or modify communication sessions. Illustratively, before executing an operation, a template is transmitted between a network client and a server such that, at the receiving end of such communications link, delta information elements are captured from the sender for insertion within the template enabling conversion back to a standard message at the receiver end. Thus, by sending only deltas between the network client and server, over-the-air traffic is reduced and total application performance for a communications session is achieved significantly in less time. For purposes of this disclosure and appended claims, the terms "delta", "delta information elements" or "Δ" refers to a set of parameters and values that the client wants to modify for a particular template.

Unfortunately, the variety of telecommunications devices and features offered continues to grow exponentially which problematically adds to communication traffic as well as the increasing expectations for immediate total performance. There exists a need for reducing the size of deltas sent between the network client and the server to enhance performance Moreover, there is a need for maximizing the efficiency of deltas by dynamically adapting templates according to changing usage trends among users so that minimal wireless resource utilization is achieved. Various challenges related to template compression techniques need to be addressed.

Accordingly, there is a need for system and method for dynamically updating templates for compressed messages.

BRIEF DESCRIPTION OF THE FIGURES

The accompanying figures, where like reference numerals refer to identical or functionally similar elements throughout the separate views, together with the detailed description below, are incorporated in and form part of the specification and serve to further illustrate various embodiments of concepts that include the claimed invention, and to explain various principles and advantages of those embodiments.

FIG. 8 is a bit layout illustrating a sample Template Update Proposal Message in accordance with the present disclosure.

FIG. 9 is a bit layout illustrating a sample Template Update Response Message in accordance with the present disclosure.

Figure 1:
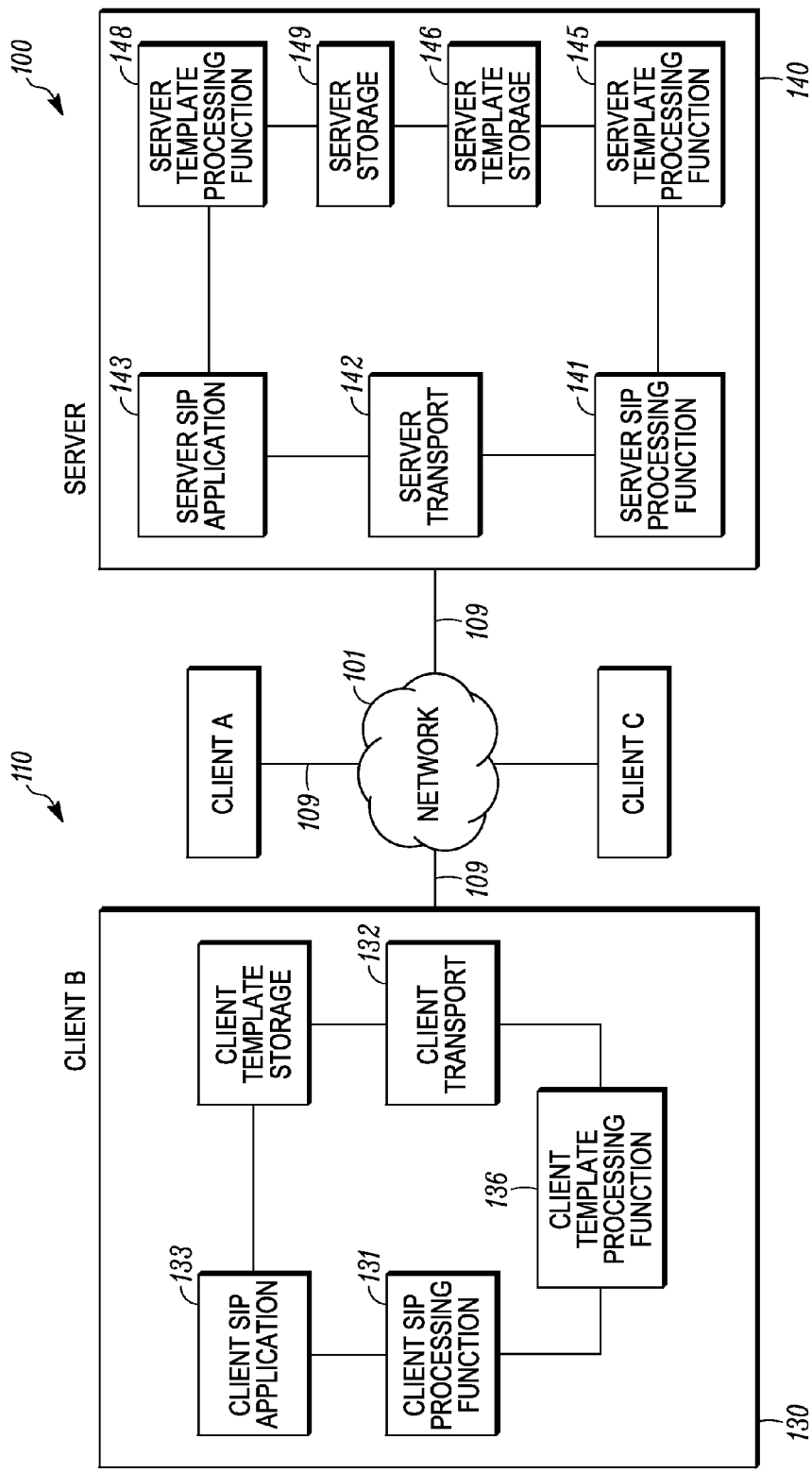
FIG. 1 is a system diagram illustrating a communication network in accordance with embodiments of the present disclosure featuring a system for dynamically updating templates for compressed messages via a server.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides a system and method for dynamically updating templates for compressed messages, such as for Session Internet Protocol messages. Illustrative embodiments of the present disclosure and appended claims, as described below, are applicable to any type of Session Internet Protocol (SIP) message, such as, among others, SIP request messages including SIP Invite messages, SIP Response messages including 200 OK messages.

Accordingly, a general method for updating a message template based on receiving a plurality of common deltas is appreciated as follows. At a first device, such as a server or a client device, the method detects a first compressed message that includes a first delta and that references a first message template and stores an indication of having received the first delta. The first delta is combinable with the first message template to reconstruct a decompressed message. The first device receives at least one subsequent compressed message that includes the first delta and that references the first message template, and stores an indication of each subsequent time the first delta is received. Based on the stored indications, the first device determines that the first delta was received in accordance with at least one predetermined threshold factor, and in response thereto, initiates a procedure to generate a superseding message template, which updates the first message template by including the first delta.

Further illustrative methods for dynamically updating templates for compressed messages include a server in a communication network system receiving a compressed message from a client, such as a client in a talkgroup. The compressed message includes a delta.

The server selects a message template from a plurality of stored message templates based on the compressed message. For example, as discussed in detail below, a template index in the compressed message may indicate which particular template is being used. The server then incorporates the delta with the message template for message decompression at the server. The server acts on the decompressed message within the context of a communication session for client participation. In at least one embodiment, only one delta is sent to the server at a time by the client although the server may have any number of deltas stored at any given time.

The server receives a subsequent compressed message from the client that includes the commonly received delta that was previously applied to the message template. In at least one embodiment, at least one subsequent compressed message having the commonly received delta is received by the server.

In one embodiment, the server dynamically identifies the need for creating a superseding message template based on the commonly received delta. The server generates a superseding message template that updates the message template by including the delta from the server delta storage. In another embodiment, the client identifies the need for creating a superseding message template based on the commonly received delta.

In at least one embodiment, the server generally includes a server template delta processing function that operates in cooperation with a server template processing function further provided by the server. The operations of the server template delta processing function and the server template processing function are performed by means of at least one processor from the particular server through programmed logic such as software applications or firmware stored on the memory of the server.

Accordingly, in at least one embodiment, any combination of one or more of the following threshold factors, among others, are considered as the server template delta processing function in the continuing illustration identifies the need for creating a superseding message template based on the commonly received delta: the number of deltas received, the rate of deltas received by the server, the size of the delta as a function of potential to improve performance speed, where an entire talkgroup identifies the need to update based on the particular need identified by at least one client within the talkgroup, and where mandatory updates are pushed to an entire talkgroup by incident console operators.

Optionally, in at least one embodiment, a superseding update message template proposal is sent by the server and includes an update acceptor function for selective activation by the client. Alternatively, the server generates the superseding message template without an update acceptor function for selective activation by the client. This alternative embodiment provides mandatory updating that can be implemented when user equipment (UE) uniformity and rapid total performance are critical, such as for public safety telecommunication networks including Law Enforcement and Fire & Rescue networks or large talkgroup networks, such as a commercial carrier push-to-talk network.

At times, as described herein for purposes of this disclosure and appended claims, the terms "User", "User Agent Client", "Client", "Subscriber(s)" and "Source/Destination Endpoint" are used interchangeably for a logical network endpoint that transmits or receives SIP messages through a user agent server. Moreover it is understood that subscriber refers to one or more operators of user equipment (UE). Although there are other embodiments for UE, for purposes of illustration in this disclosure, the UE comprises a wireless mobile device.

The subscribers can be members of a group or talkgroup that include a combination of preconfigured users, ad hoc users or members. Alternatively, subscribers may not be members of such groups. As described herein, a communication group in a communication network system is referred to as a "talkgroup" or "group". A communication network system features a plurality of talkgroups where it is possible for a user to be a member of any combination of talkgroups. Illustratively, an endpoint assigned to an ambulance may be a member of a Fire & Rescue talkgroup as well as a Law Enforcement talkgroup. Each subscriber engages in a communication session by way of any combination of UE comprising hardware and software and/or firmware. Further, certain advantages of the methods as described herein, are beneficial and may be applied to any type of user agent, such as a client or server, on the network.

The systems and methods for dynamic template updating for compressed messages are compatible with established signaling standards and protocols for controlling multimedia communication sessions over the internet, for example, as is described in the RFC 3261 series documents. See generally, Internet Engineering Task Force (IETF) protocol RFC 3261 (Session Initiation Protocol) dated June 2002 and any subsequent revisions. Specifically, the IETF document includes a description of a protocol that can be used for setting up, tearing down, and modifying unicast or multicast sessions that include at least one media stream. In particular, session modifications include inviting more clients, adding or subtracting media streams, and changing addresses or ports.

While embodiments of the present disclosure employ various teachings of the aforementioned standards and protocols, the embodiments as described herein are not limited by these protocols. Those skilled in the art will realize that the above recognized advantages and other advantages described herein are merely illustrative and are not meant to be a complete rendering of all of the advantages of the various embodiments.

Generally, a system for updating a message template includes a network and a first device within the network. The first device includes a first device template delta processing function and a delta storage each operatively coupled with one another. The first device template delta processing function detects a first compressed message that includes a first delta and references a first message template. The first delta is combinable with the first message template to reconstruct a decompressed message. The first device template delta processing function stores an indication having received the first delta.

The first device template delta processing function receives at least one subsequent compressed message that includes the first delta and that references the first message template. The first device template then stores an indication of each subsequent time the first delta is received. The first device template delta processing function determines based on stored indications, that the first delta was received in accordance with at least one predetermined threshold factor, and in response thereto, initiates a procedure to generate a superseding message template, which updates the first message template by including the first delta.

Referring now to the figures, FIG. 1 illustrates a dynamic template updating system 100. The dynamic template updating system 100 provides a specific depiction of a physical implementation of various embodiments of the present disclosure whereby the above first device comprises a server whereas in FIG. 2 the first device comprises a network client. Specifically, the illustrative dynamic template updating system 100 is designed for implementation of various methods of establishing dynamic template updating for compressed messages on the dynamic template updating system 100. The dynamic template updating system 100 includes a communication network 101. Generally, the dynamic template updating system 100 for the embodiment of FIG. 1 includes a server 140 that dynamically identifies the need to update a template whereas a dynamic template updating system 200 for the embodiment of FIG. 2 includes at least one network client 230 for dynamically identifying the need to update a template.

As shown in FIG. 1, a talkgroup 110 and the server 140 are each in communication with the communication network 101 as indicated by reference line 109. The interface between member of the talkgroup 110 and the server 140 may be either wired or wireless. For the embodiment of FIG. 1, the server 140 includes a server SIP processing function 141, a server transport function 142, a server SIP application function 143, a server template processing function 145, a server template storage 146, a server template delta processing function 148, and a server template delta storage 149.

The talkgroup 110 includes at least one client 130. Illustratively, FIG. 1 shows a talkgroup 110 including Client A, Client B, and Client C. For purposes of illustration each client features common components, processes and functions. As shown for the embodiment of FIG. 1, the client 130 includes a client SIP processing function 131, a client transport function 132, a client SIP application function 133, and a client template processing function 136.

Although embodiments of the present disclosure and appended claims are applicable to any type of Session Internet Protocol (SIP) message, a SIP request message in the context of an SIP invite message will now be discussed for illustrative purposes. The client 130 includes a client SIP application function 133 that requires the services of a server SIP application to communicate with other members of a talkgroup over the communication network 101, such as the internet. In at least one embodiment, the client SIP application function 133 is a software application. The client SIP application 133, the client SIP processing function 131, the client template processing function 136, and the client transport function 132 may collectively comprise a wireless mobile device, such as, among others, a pager, a mobile phone having call functionality, a mobile phone having call and personal computer functionalities, and other well known devices capable of running applications and accessing the internet on a variety of platforms that are well known in the industry.

Specifically, the client SIP application function 133 initiates a communication session to the server SIP application function 143 with a SIP invite message. Without the methods for dynamic template updating for compressed messages, typical SIP invite messages features a header and body that is several thousands of bytes of information in length that often compromise performance along presently limited wireless bandwidth links between the client and the server. By contrast, the client template processing function 136 determines whether to send a compressed message that includes a template is that required for transport to the server 140 in lieu of a relatively lengthier common SIP invite message.

Accordingly, upon selecting the necessary template, the client template processing function 136 compresses the message, i.e. the SIP invite message in the condensed format or "template" shown in FIG. 8, and forwards the compressed message to the client SIP processing function 131. The client SIP processing function 131 forwards the compressed message to the client transport function 132 for transmission over link 109 to the server 140. The compressed message is typically under one hundred bytes in length, such as between 20-50 bytes.

Specifically, the client template processing function 136 specifically includes a message originator function. The message originator function creates a compressed message by initially extracting a message template from an original full message to determine a corresponding delta. The delta is then combined with a template identifier or "index" to thereby create a compressed message for transmission from a source endpoint to a corresponding destination endpoint. In the continuing illustration, the source endpoint comprises the client 130 whereby the compressed message of a delta and template identifier are transmitted to the server 140 whereas in other embodiments such operations may occur at the server template processing function 145 for compressed transmissions to the client 130. At times, as described herein, the terms "template", and "message template" are used interchangeably.

With continued reference to FIG. 1, the compressed message is then received by the server transport function 142 from the client transport function 132. The server transport function 142 forwards the received message to the server SIP processing function 141. As such, the server SIP processing function 141 determines that the message is a compressed message and then forwards the message to the server template processing function 145 for decompression. The server template processing function 145 identifies the necessary corresponding template required for decompression and retrieves such template from the server template storage 146.

The server template processing function 145 receives the compressed message at the sever 140. Specifically, the server template processing function 145 includes a message receiver function that reconstructs the full message by initially retrieving an identical message template from the server template storage 146 in accordance with the template identifier. The received delta is then incorporated with the message template to reconstruct a full message therefrom.

Furthermore, in at least one embodiment, the corresponding template is previously stored, such as during client registration processes. Specifically, during registration, the client SIP application 133 communicates with a server SIP processing function 141. At that time, the server SIP application function 133 sets up the message template in both the client template processing function 136 and the server SIP processing function 145 as well as stores the template in the sever template storage 146. Thus, in the illustration, the server SIP processing function 141 selects a corresponding compressed message template from the server template storage 146 based on the SIP invite message.

The functional elements of the server and client devices as described herein are each implemented using (although not shown) a memory, one or more network interfaces, and a processing device that are operatively coupled, and which when programmed form the means for these system elements to implement their desired functionality, for example as illustrated by reference to the method and diagrams as shown in FIG. 3 to FIG. 9. The network interfaces (i.e., client transport functions), are used for passing signaling, also referred to herein as messaging, (e.g., messages, packets, datagrams, frames, superframes, and the like) between the elements of the system 100. The implementation of the network interface in any particular element depends on the particular type of network, i.e., wired and/or wireless, to which the element is connected.

Where the network supports wireless communications, the interfaces comprise elements including processing, modulating, and transceiver elements that are operable in accordance with any one or more standard or proprietary wireless over-the-air interfaces, wherein some of the functionality of the processing, modulating, and transceiver elements may be performed by means of the processing device through programmed logic such as software applications or firmware stored on the memory device of the system element or through hardware.

The processing device utilized by the functional elements of the server and client devices may be programmed with software or firmware logic or code for performing functionality described by reference to FIG. 3 to FIG. 9; and/or the processing device may be implemented in hardware, for example, as a state machine or ASIC (application specific integrated circuit) to perform such functionality. In addition to the above-mentioned functionality, implemented via programmed logic or code, the processor of a given device is further programmed with logic or code for performing signaling and functionality to facilitate methods in accordance with the teachings disclosed herein, such as, among others, methods described by reference herein. Furthermore, the processing device may be implemented as either as a state machine or an application specific integrated circuit, "ASIC". The memory in a device, such as a server template storage, a server template delta storage, a client template storage, and a client template delta storage, includes any readily recognizable combination of short-term and long-term storage of various data needed for the functioning of the device and its intended functionality.

Illustratively, in one embodiment, a computer-readable storage element features a computer readable code stored thereon for programming a computer to perform a method for updating a message template based on receiving a plurality of common deltas. At a first device, method includes the following. A first compressed message is detected by the first device that includes a first delta and that references a first message template, wherein the first delta is combinable with the first message template to reconstruct a decompressed message. An indication of having received the first delta is then stored. At least one subsequent compressed message is received that includes the first delta and that references the first message template and an indication of each subsequent time the first delta is stored. Based on the stored indications, the first device determines that the first delta was received in accordance with at least one predetermined threshold factor, and, in response thereto, initiates a procedure to generate a superseding message template, which updates the first message template by including the first delta. Optionally, the first device receives an update acceptance message from the client.

FIG. 8 shows a bit layout of a sample compressed message. Specifically, in one embodiment, the sample compressed message comprises a Template Update Proposal Message 800. The template update proposal message 800 provides a recipient with the opportunity to modify a specific stored template with a superseding message template based on a commonly received delta. Further, the bit layout samples of compressed messages in FIGS. 8-9 are applicable to any type of Session Internet Protocol (SIP) message, such as, among others, SIP request messages including SIP Invite messages.

The template update proposal message 800 features a finite number of fields. As shown, an update proposal message identifier field 801 indicates the kind of SIP message, such as a SIP invite message. A template index field 802 is an identifier that indicates to the compressed message recipient which particular stored template is to be referenced for reconstruction therewith. A mandatory update on/off flag field 803 further identifies whether the template update proposal message 800 will be provided to the recipient either mandatorily, e.g., ("ON"), or as option for the recipient, e.g., ("OFF"). A delta update field 805 provides the specific delta, i.e. parameters and values for modifying the template for the communication session. Although a plurality of deltas can be provided with the SIP compressed message 800, at least one embodiment provides for only one delta per SIP compressed message 800 at a time to control traffic on the link 109 and ensure rapid total client performance FIG. 9 is a bit layout of a sample compressed message comprising a Template Update Proposal Response Message 900. Accordingly, after presented with the option of receiving the template update proposal message 800 via the mandatory update on/off flag field 803 rendered in the "ON" configuration, the recipient, such as a network client, responds by transmitting the illustrated template update proposal response message 900 to the sender, such as the server.

In particular, an update response message identifier field 801 indicates the kind of SIP message, such as a SIP invite message. A template index field 802 is an identifier that indicates to this compressed message recipient which particular stored template is to be referenced for reconstruction therewith. An accept update on/off flag field 803 further identifies whether the template update proposal message 800 will be accepted by the recipient, e.g., ("ON") or declined by the recipient e.g., ("OFF").

In the continuing illustration for FIG. 1, in a similar manner implemented by the server template processing function 145, the server SIP processing function 141 determines that the template further includes a delta. The server SIP processing function 141 then forwards the specific delta provided by the delta update field 805, i.e. parameters and value for modifying the template for the communication session, to the server template delta processing function 148 for further message decompression processing. As discussed in greater detail below, the server template delta processing function 148 determines whether the delta is previously stored within the server delta storage 149 to thereby dynamically identify the need for creating a superseding compressed message template based on the commonly received delta via the server template processing function 145 among other factors for needed identification.

However, for the present communication session request, the server template delta processing function 148 inserts the delta in the corresponding template as a requirement for decompression by the server template processing function 145. Accordingly, the server template delta processing function 148 generates a decompressed message from the new message template that includes the delta.

The server may designate at least one message template to the particular client from the plurality of stored messages templates. Illustratively, a plurality of templates may be assigned to a client-ambulance's user equipment whereby one template is designated for client use as a member of a Fire & Rescue talkgroup whereas another template is designated for use by the same client as a member of a Law Enforcement talkgroup.

The server template processing function 145 sends the resulting decompressed message to the SIP server processing function 141. The SIP server processing function 141 forwards the decompressed message within the server 140 to the server SIP application 143. The server SIP application 143 is then operatively directed by the message to establish the client requested communication session.

Referring now to FIG. 300, a general method for updating a message template based on receiving a plurality of common deltas is appreciated as follows. At 310 a first device, such as a server or a client, detects a first message that includes a first delta and that references a first message template, wherein the first delta is combinable with the first message template to reconstruct a decompressed message. The first device then stores an indication of having received the first delta.

The first device at 320 receives at least one subsequent compressed message that includes the first delta and that references the first message template and stores an indication of each subsequent time the first delta is received. At 330 the first device determines, based on the stored indications, that the first delta was received in accordance with at least one predetermined threshold factor, such as the number of deltas received. If a predetermined threshold factor was not detected, the first device returns to 320. If a predetermined threshold factor is detected, the first device at 340 initiates a procedure to generate a superseding message template which updates the first message template by including the first delta. Accordingly, in at least one embodiment, any combination of one or more of the following threshold factors, among others, is considered as the first device's delta processing function to initiate a procedure to generate a superseding message template which updates the first message template by including the commonly received first delta: the number of deltas received, the rate of deltas received by the server, the size of the delta as a function of potential to improve performance speed, where an entire talkgroup identifies the need to update based on the particular need identified by at least one client within the talkgroup, and where mandatory updates are pushed to an entire talkgroup by incident console operators.

Figure 2:
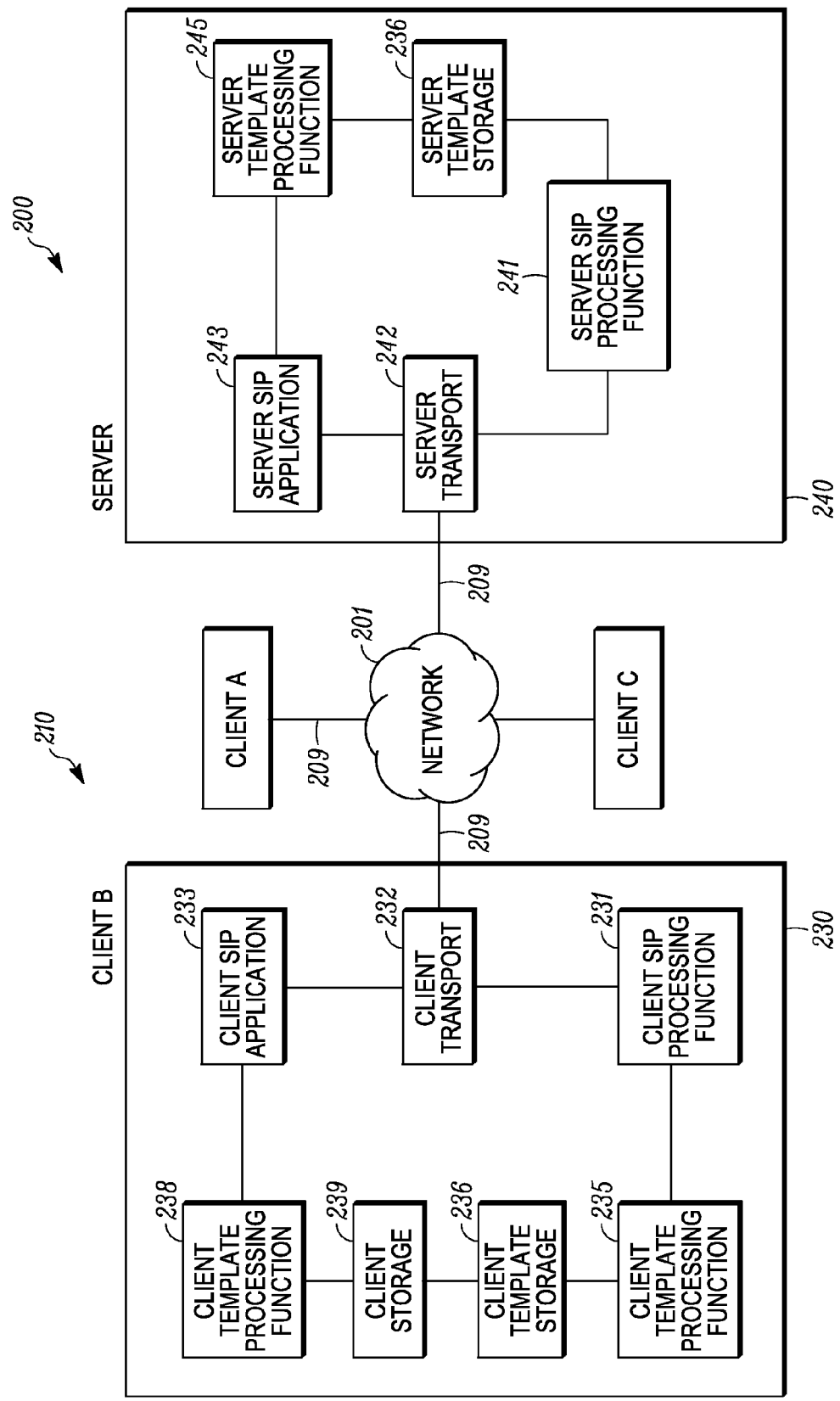
FIG. 2 is a system diagram illustrating a communication network in accordance with one alternative embodiment featuring a system for dynamically updating templates for compressed messages via a network client.
Figure 3:
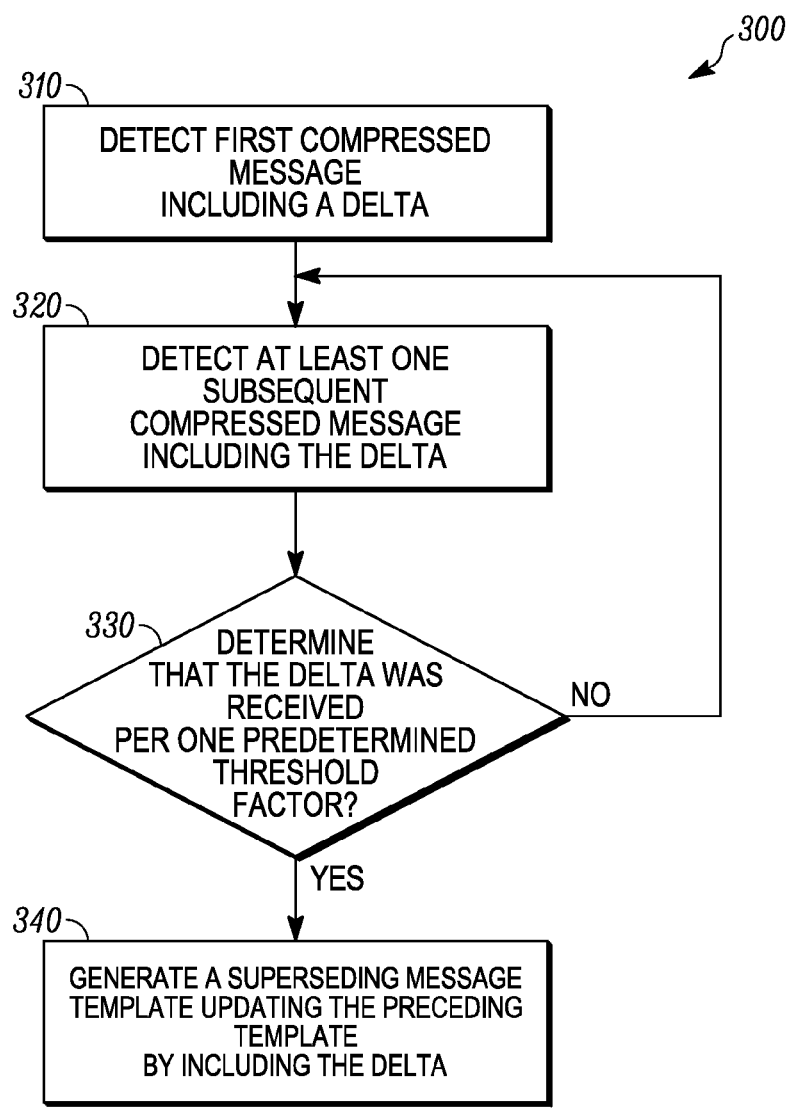
FIG. 3 is a flow diagram generally illustrating a method by which a first device, such as a either a server or network client, updates a message template based on receiving a plurality of common deltas.
Figure 4:
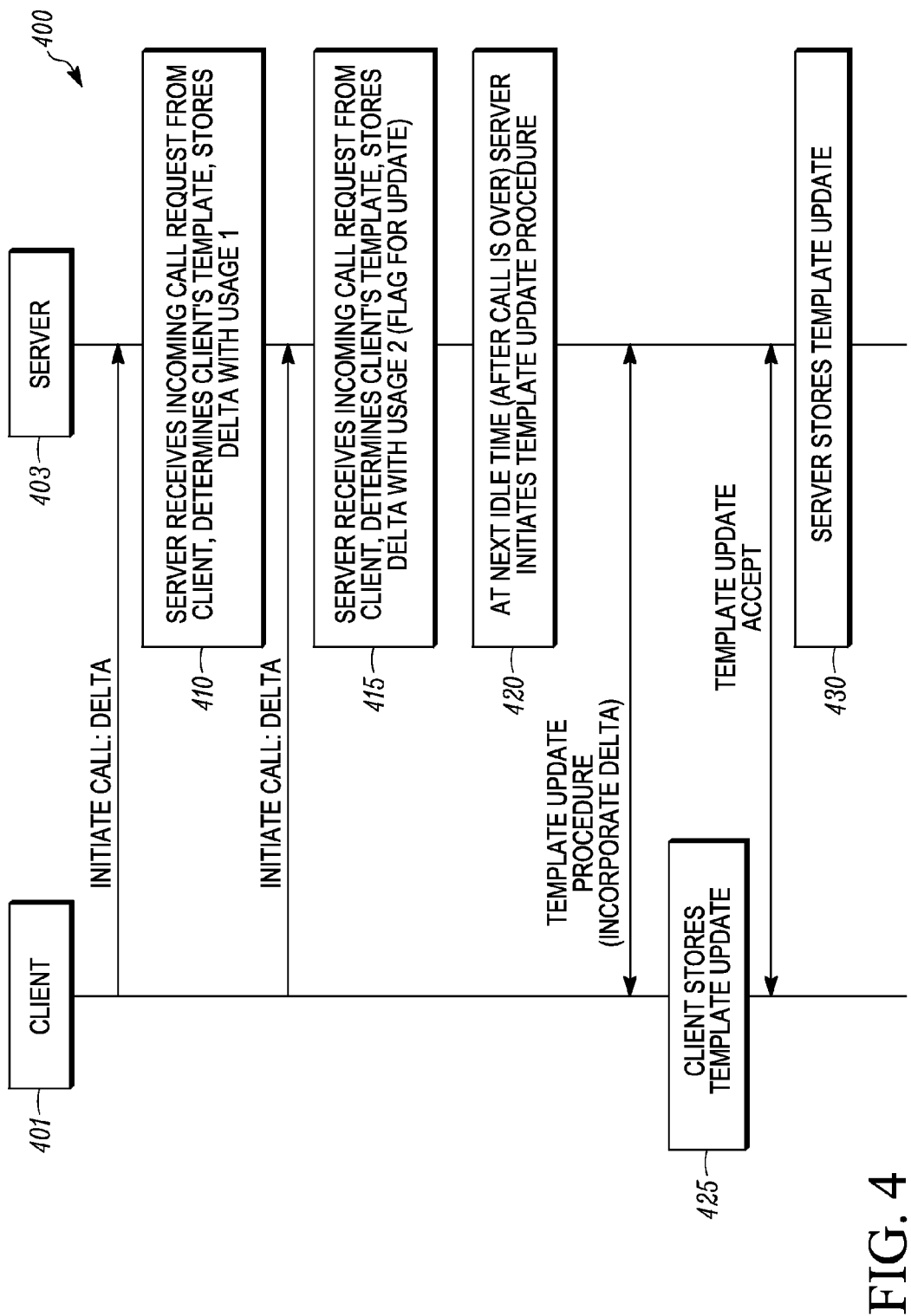
FIG. 4 is a sequence diagram showing an illustrative method for message compression between a source network client and a server by dynamically identifying the need for creating a superseding message template with a server based on a commonly received delta.
Figure 5:
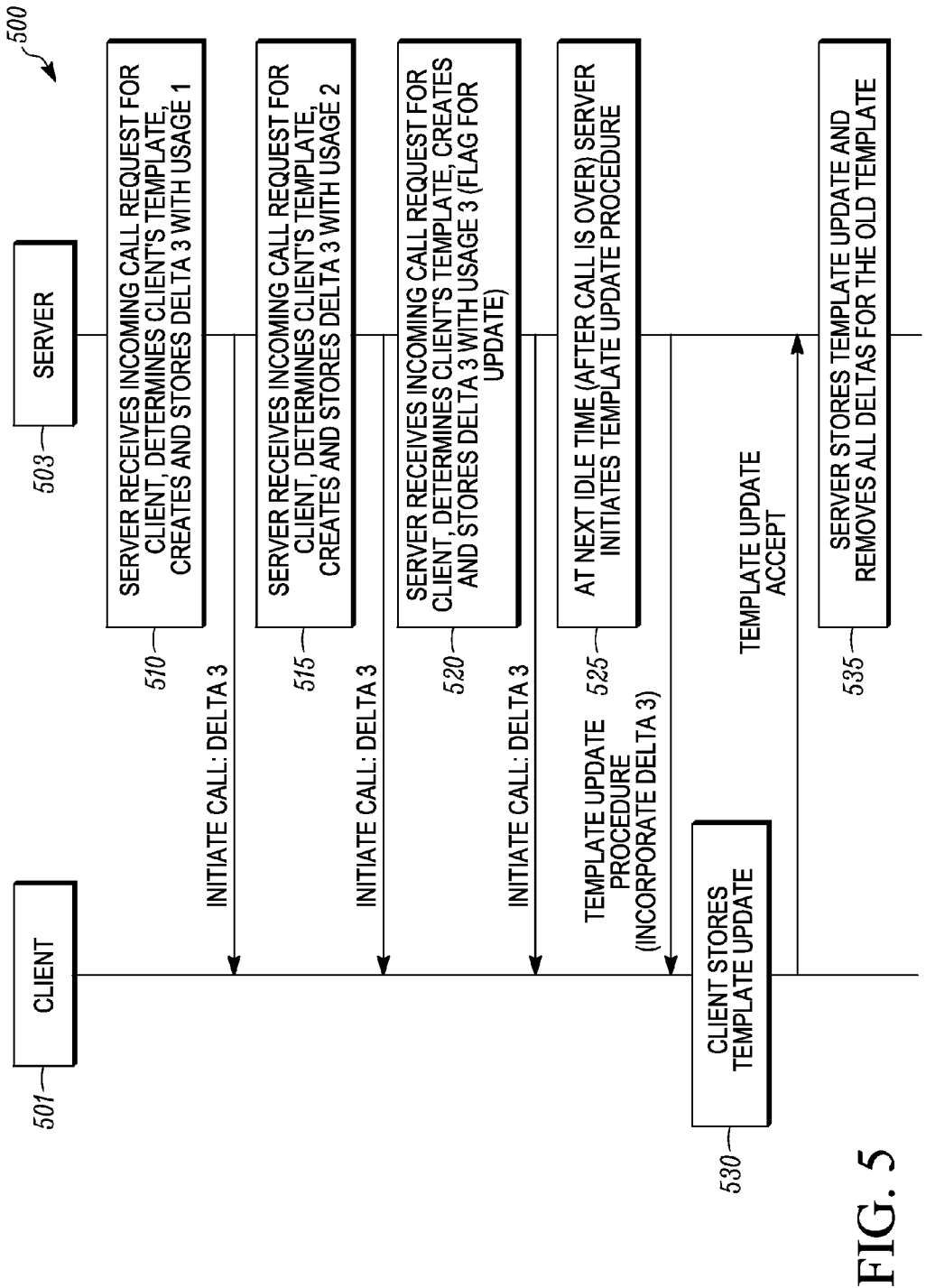
FIG. 5 is a sequence diagram showing another illustrative method for message compression between a destination network client and a server by dynamically identifying the need for creating a superseding message template with a server based on a commonly received delta.
Figure 6:
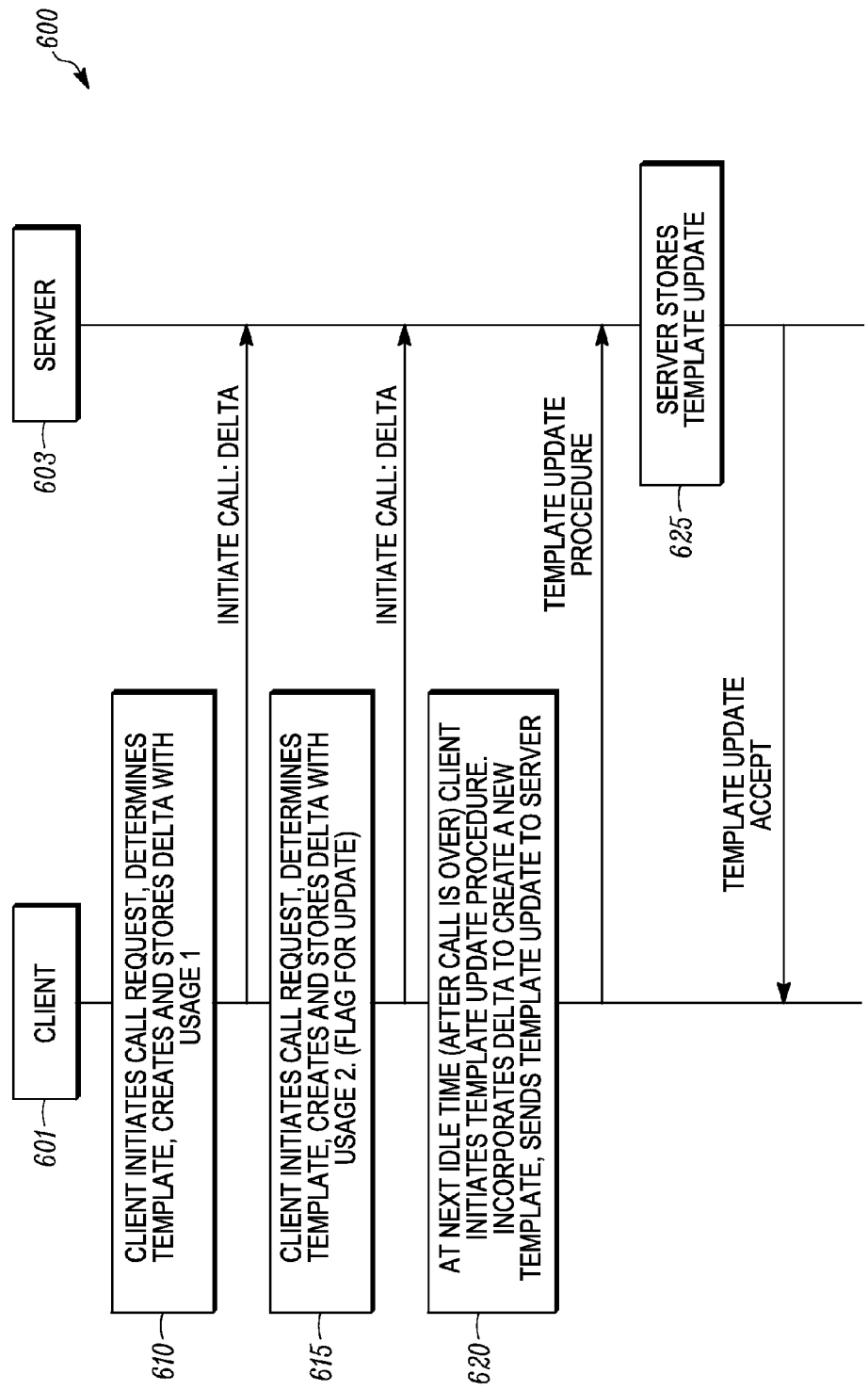
FIG. 6 is a sequence diagram showing an illustrative method for message compression between a source network client and a server by dynamically identifying the need for creating a superseding message template with a client based on a commonly received delta.
Figure 7:
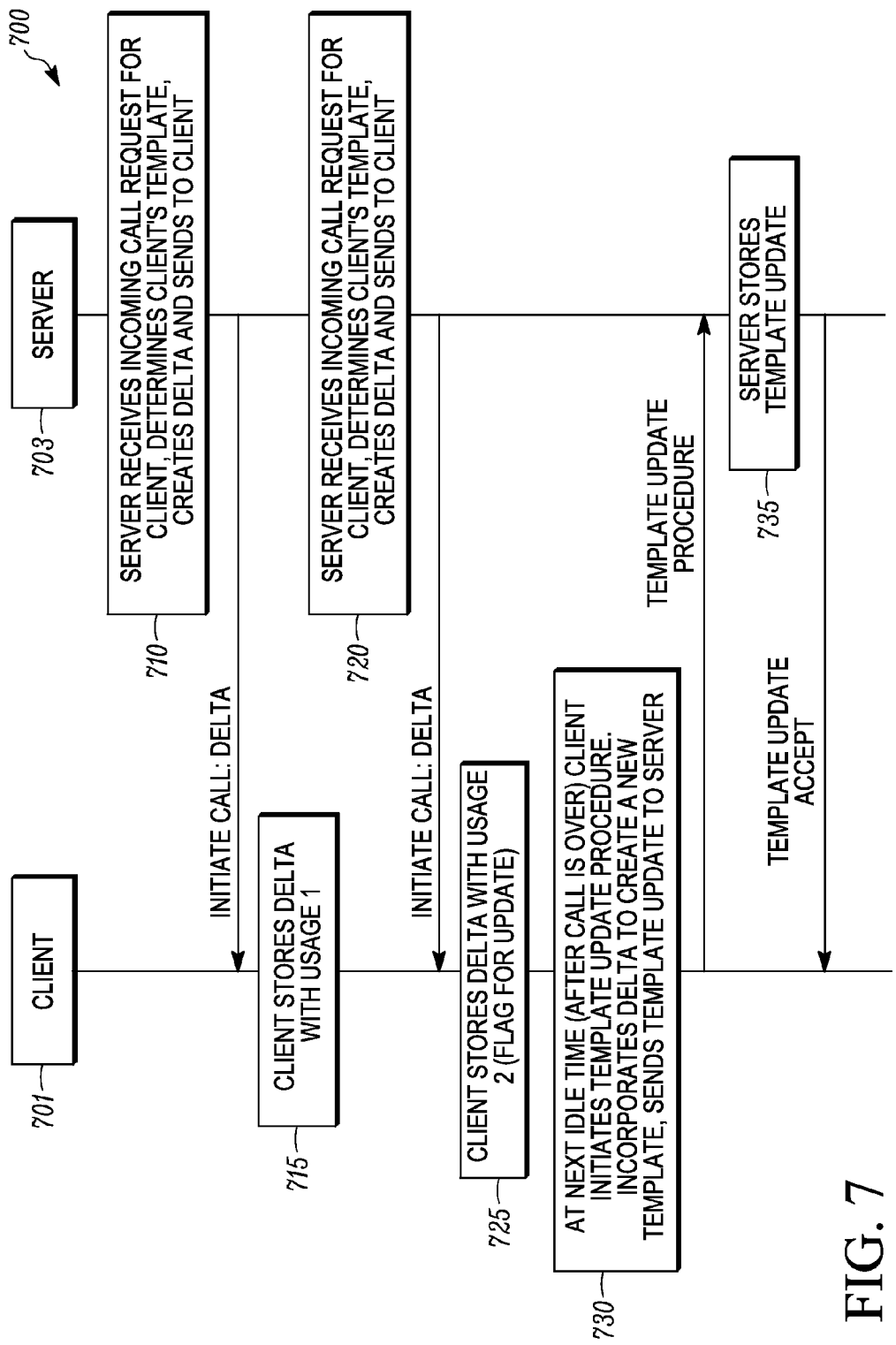
FIG. 7 is a sequence diagram showing another illustrative method for message compression between a destination network client and a server by dynamically identifying the need for creating a superseding message template with a client based on a commonly received delta.

In particular, as depicted in FIGS. 1 and 4-5, the first device comprises a server device. Accordingly, in FIG. 4, the first and at least one subsequent compressed message each comprise an uplink message from a client device whereas in FIG. 5 comprises a downlink message from the server to one or more client devices. Similarly, as depicted in FIGS. 2 and 6-7 the first device comprises a client device. Accordingly, in FIG. 6, the first and at least one subsequent compressed message each comprise an uplink message from a server device whereas in FIG. 7 comprises a downlink message from the server device.

In one general illustration, as described above, a server receives a compressed message having a delta from a client. In one embodiment, the network client is wirelessly linked to the server. The method of message compression, in at least one embodiment, is provided within a Session Initiation Protocol (SIP) communication system.

The server selects a message template from a plurality of stored message templates based on the compressed message. The server then incorporates the delta with the message template to perform message decompression as illustrated by the server delta processing function 145 inserting the delta in the corresponding template to perform message decompression.

In at least one embodiment, the template comprises a preconfigured template having a plurality of fields. The delta modifies at least one of the plurality of fields. In at least one embodiment, a mandatory update on/off flag is included with the compressed message to correspondingly indicate to a processing function, such as the client SIP processing function, whether a delta is provided to modify the particular stored template during the communication session.

The server receives a subsequent compressed message from the client that includes the same delta, i.e. identical modifying parameters and values. In at least one embodiment, the server receives a plurality of subsequent compressed messages from the client each including the same previously identified delta. In at least one embodiment, the server receives another compressed message request from another client. As such, the compressed message request from another client includes the same delta that is applied to the message template and stored in the server delta storage 149.

The server dynamically identifies the need for creating a superseding message template based on the commonly received delta. Particularly, for the embodiment of FIG. 1, the server template delta processing function 148 dynamically identifies the need for creating a superseding compressed message template based on the commonly received delta. In one embodiment, the process of dynamically identifying the need for creating a superseding message template includes storing the delta in memory at the server delta storage for reference by the server template delta processing function. In at least one embodiment, the process of dynamically identifying the need for creating a superseding message template includes the server template delta processing function comparing deltas from the server delta storage.

Accordingly, in at least one embodiment, any combination of one or more of the following threshold factors, among others, will be considered as the server template delta processing function 148 identifies the need for creating a superseding message template based on the commonly received delta: the number of deltas received, the rate of deltas received by the server, the size of the delta as a function of potential to improve performance speed, where an entire talkgroup identifies the need to update based on the particular need identified by at least one client within the talkgroup, and where mandatory updates are pushed to an entire talkgroup by incident console operators.

As the need is identified, the server generates a superseding message template that updates the message template by including the delta from the server delta storage. In at least one embodiment, the new message template is applied to at least one other client from a group of clients.

Optionally, in at least one embodiment, a superseding update message template proposal is sent by the server to the client and includes an update acceptor function for selective activation by the client. In particular, if the update acceptor function is selectively denied (e.g., a negative response) by the client then the superseding update message template proposal including the delta is not incorporated with the existing message template. If the superseding update template message proposal for the same delta is consistently denied, then the delta and the superseding update template message proposal are stored in the server 140 for future access by the server template processing function 145 to prevent further proposals based on this delta.

Alternatively, if the update acceptor function is selectively approved (e.g., a positive response) by the client then the superseding update message template proposal including the delta is thus incorporated with the message template. Thereafter, the server receives an update acceptance message from the client, such as the illustrated template update proposal response message 600. The server stores the superseding message template having the integrated delta in a server memory storage, such as a server template storage, as the new message template and removes the delta for deletion that is associated with the message template from the server memory storage, such as a server delta storage.

In another embodiment, the server generates the superseding message template without receiving an update acceptor function for selective activation by the client as illustrated in one embodiment as the template update proposal response message 900 of FIG. 9. This alternative embodiment provides mandatory updating that can be implemented when UE uniformity and rapid total performance are critical via the mandatory update on/off flag 803 as shown in FIG. 8.

A method for SIP message compression for a mobile unit may be further appreciated as follows. Similar to the above described method, the mobile unit receives a SIP compressed message including a delta from a server. In at least one embodiment, each SIP compressed message includes a template identifier, such as an update response message identifier field 801, for the corresponding delta. The server selects a message template from a plurality of stored message templates based on the SIP compressed message. Further, the server incorporates the delta with the message template so that the message template may be applied to a resulting communication session with the mobile unit.

Thereafter, the server receives at least one subsequent SIP compressed message from the mobile unit that includes the same delta. Based on the commonly received delta, the server dynamically identifies the need for creating a superseding message template. Accordingly, the server generates a superseding message template that updates the message template by including the delta. In one embodiment, a server template delta processing function provided by the server compares deltas from the server storage. The superseding message template is stored at the server as the new message template while the server removes the delta from the server delta storage for deletion thereof At times, as described herein, the terms "mobile unit", "user equipment" and "mobile device" are used interchangeably.

Referring now to FIG. 2, an alternative embodiment of a dynamic template updating system 200 is described as follows. The dynamic template updating system 200 provides a general depiction of a physical implementation of various embodiments of the present disclosure. Specifically, the illustrative dynamic template updating system 200 is designed for implementation of various methods of establishing dynamic template updating for compressed messages sent on the dynamic template updating system 200. The dynamic template updating system 200 of FIG. 2 is similar to the dynamic template updating system 100 described above. However, the dynamic template updating system 200 for the embodiment of FIG. 2 includes at least one network client 230 for dynamically identifying the need to update a template whereas the dynamic template updating system 100 for the embodiment of FIG. 1 includes a server 140 that dynamically identifies the need to update a template.

Comparing FIG. 2 with FIG. 1, the following aspects are identical and are incorporated by reference. A talkgroup 210 and the server 240 are each in communication with the communication network 201 as indicated by reference line 209. The server 240 includes a server SIP processing function 241, a server transport function 242, a server SIP application function 243, and a server template processing function 245. The talkgroup 210 further includes at least one client 230. Illustratively, FIG. 2 shows a talkgroup 210 including Client A, Client B, and Client C. For purposes of illustration each client features common components, processes and functions. As shown for the embodiment of FIG. 2, the client 230 includes a client SIP processing function 231, a client transport function 232, a client SIP application function 233, and a client template processing function 235.

By contrast, however, the client 230 of FIG. 2 further includes a client template delta processing function 238 for dynamically identifying the need for creating a superseding message template whereas the embodiment of FIG. 1 provides the template delta processing function in the server 140 whereby the client 230 dynamically identifies an update need in a similar manner to that of the server 140. In FIG. 2, the client template delta processing function 238 and the client template processing function 235 cooperate to identify and update a specific message template with a superseding message template that incorporates the desired delta. Specifically, the client 230 includes a client delta storage 239 that is linked to client template delta storage processing function 238 and a client template storage 238 that is linked to the template processing function 235. A storage memory for template and a delta storage may be placed in either the client 230 or the server 240, whichever provides the greatest performance and capacity without compromising the operations of the client template delta processing function 238. Illustratively, due to limited performance capacity, a client 230 comprising a mobile device may feature a client template delta processing function 238 linked to both a client template storage 236 and a client delta storage 239 functionally positioned at the server 240 (not shown).

A method for message compression between a network client and a server is appreciated as follows. As described above, a network client sends a compressed message having a delta to the server. In one embodiment, the network client is wirelessly linked to the server. In at least one embodiment, the method of message compression is provided within a Session Initiation Protocol (SIP) communication system.

Thus, to initiate the communication session, the client template processing function 235 of the network client 230 specifically includes a message originator function. The message originator function creates a compressed message by initially extracting a message template from an original full message to determine a corresponding delta. The delta is then combined with a template identifier or "index" to thereby create a compressed message for transmission from a source endpoint to a corresponding destination endpoint, such as from the client 230 to the server 240 or alternatively from the client 230 to another client.

The server template processing function 245 receives the compressed message at the sever 240. Specifically, the server template processing function 245 includes a message receiver function that reconstructs the full message by initially retrieving an identical message template that is stored in the server 24 in accordance with the template identifier. The received delta is then incorporated with the message template to reconstruct a full message therefrom.

The client template delta processing function 238 takes note each time the delta is transmitted from the client and stores the delta in the client delta storage 239. The client template delta processing function 238 then sends a subsequent compressed message that includes the delta to the server, or to the client in alternative embodiments.

Accordingly, the client template delta processing function 238 dynamically identifies the need for creating a superseding message template based on the commonly received delta. The client template processing function 236 specifically constructs a superseding message template that updates the message template by including the delta from the client storage. Similar to the above described optional performance, the server 240, or other destination endpoint, sends an update acceptance to the client 230 to update the message template with the superseding message template.

Generally, the embodiments described above discuss variations by which the above delta trend identification methods may be applied to various compressed communication messages and the factors implemented for identifying such trends. Specific examples of these variations are shown in FIGS. 4-5 for uplink and downlink messaging with respect to the server and with respect to the client in FIGS. 6-7. FIG. 4 sequentially illustrates one illustrative method for message compression 400 along an uplink between a source network client 401 and a server 403 for a SIP invite message by dynamically identifying the need for creating a superseding message template via the server 503 based on a commonly received delta. FIG. 5 sequentially illustrates one illustrative method for message compression 500 along a downlink between a destination network client 501 and a server 503 for a SIP invite message by dynamically identifying the need for creating a superseding message template via the server based on a commonly received delta.

With specific reference to FIG. 4, the method for message compression 400 at 410 the server 403 receives an incoming request from the client 401. The method 400 is generally characterized as an "uplink" operation whereby the messages are originated from the client to the server. In the manner described above, the server 403 at 410 determines what pre-stored template is appropriate for the given delta and stores the received delta in a memory. Subsequently at 415, the server receives at least one other request from the client 401, determines the appropriate client template, and stores the received delta.

At 420, the server 403 initiates a template update procedure whereby the server 403 generates a superseding message template that updates the message template by including the delta from the server storage. At 425, the client 401 stores the superseding message template. Alternatively, the client 401 is given the option to accept the superseding message template whereby, upon acceptance, the server 403 likewise stores the superseding message template.

In FIG. 5, the method for message compression 500 at 510 the server 503 receives an incoming request from the client 501. The method 500 is generally characterized as an "downlink" operation whereby the messages are originated from the server to the client. In the manner described above, the server 503 at 510 determines what pre-stored template is appropriate for the given delta and stores the received delta, Delta3, in a memory. Subsequently at 515 and 520, the server 503 receives at least one other request from the client, determines the appropriate client template, and stores the received delta, Delta3.

At 520, the server 503 is triggered to initiate a template update procedure at 525. The sever 503 is triggered after receiving Delta 3 with three client call requests; however, there may be other preset triggering factors. At 525, the server 503 generates a superseding message template that updates the message template by including the delta, Delta3, from the server storage. At 530, the client 501 stores the superseding message template and is given the option to accept the superseding message template whereby, upon acceptance, the server 503 likewise stores the superseding message template at 535.

FIG. 6 sequentially illustrates one illustrative method for message compression 600 along an uplink between a source network client 601 and a server 603 for a SIP invite message by dynamically identifying the need for creating a superseding message template via the client 601 based on a commonly received delta. FIG. 7 sequentially illustrates one illustrative method for message compression 700 along a downlink between a destination network client 701 and a server 703 for a SIP invite message by dynamically identifying the need for creating a superseding message template via the client based on a commonly received delta.

With specific reference to FIG. 6, the method for message compression 600 at 610 the client 601 initiates a call request with respect to the server 603. The method 600 is generally characterized as an "uplink" operation whereby the messages are originated from the client to the server. In the manner described above, the client 601 at 610 determines what pre-stored template is appropriate for a delta and stores the received delta in a memory. Subsequently at 615, the client 601 sends at least one other call request to the server 403, determines the appropriate template, and stores the delta.

At 620, the client 601 initiates a template update procedure whereby the client 601 generates a superseding message template that updates the message template by including the delta from the storage. At 625, the server 603 stores the superseding message template. Alternatively, the server 603 is given the option to accept the superseding message template whereby, upon acceptance, the client 601 likewise stores the superseding message template.

In FIG. 7, the method for message compression 700 at 710 the server 703 receives an incoming request from the client 701. The method 700 is generally characterized as an "downlink" operation whereby the messages are originated from the server to the client. In the manner described above, the server 703 at 710 determines what pre-stored template is appropriate for the a generated delta and sends the delta to the client 701. The client 701 stores the received delta in a memory at 715. Subsequently at 720 and 725, the server 703 receives at least one other request from the client, determines the appropriate client template, and the client 701 stores the received delta.

At 730, the client 701 is triggered to initiate a template update procedure. The client 701 generates a superseding message template that updates the message template by including the delta from the storage. The client 701 stores the superseding message template and gives the server 703 the option to accept the superseding message template whereby, upon acceptance, the server 703 likewise stores the superseding message template at 735.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for updating a message template based on receiving a plurality of common deltas, the method comprising at a first device:
  detecting a first compressed message that includes a first delta and a template index that references a first message template, wherein the first delta is combinable with the first message template to reconstruct an uncompressed message and wherein the first delta corresponds to an extraction of the first message template from the original uncompressed message;
  retrieving the first message template based on the template index;
  storing an indication of having received the first delta;
  receiving at least one subsequent compressed message that includes the first delta and that references the first message template, and storing an indication of each subsequent time the first delta is received;
  determining, based on the stored indications, that the first delta was received in accordance with at least one threshold factor, and in response thereto, initiating a procedure to generate a superseding message template, which updates the first message template by including the first delta.

2. The method of claim 1, wherein the first device comprises a server device, and wherein the first and at least one subsequent compressed message each comprises a downlink message to one or more client devices.

3. The method of claim 1, wherein the first device comprises a server device, and wherein the first and at least one subsequent compressed message each comprises an uplink message from a client device.

4. The method of claim 1, wherein the first device comprises a client device, and wherein the first and at least one subsequent compressed message each comprises a downlink message from a server device.

5. The method of claim 1, wherein the first device comprises a client device, and wherein the first and at least one subsequent compressed message each comprises an uplink message to a server device.

6. The method of claim 1, wherein the first delta is combinable with the first message template to reconstruct an uncompressed Session Initiation Protocol compliant message.

7. The method of claim 1, wherein the first device comprises a server device, and wherein initiating the procedure to generate the superseding message template comprises:
the server device performing:
generating the superseding message template;
sending the superseding message template to at least one client device;
receiving a positive response to the request from the at least one client device; and
storing the superseding message template.

8. The method of claim 1, wherein the first device comprises a client device, and wherein initiating the procedure to generate the superseding message template comprises:
the client device performing:
generating the superseding message template;
sending the superseding message template to the server device;
receiving a positive response to the request from the at least one server device; and
storing the superseding message template.

9. The method of claim 1 further comprising generating a superseding message template update proposal.

10. The method of claim 9 further comprising transmitting the superseding message template update proposal to s second device, wherein the superseding message template update proposal includes an update acceptor function for selective activation by the second device.

11. The method of claim 10 further comprising receiving an update acceptance message from the second device.

12. The method of claim 11 further comprising:
the first device:
generating the superseding message template;
storing the superseding message template in a first device memory storage as a new message template; and
deleting the first delta for the first message template.

13. The method of claim 12 further comprising applying the new message template to at least one device, other than the first and second devices, from a group of devices.

14. The method of claim 1, wherein the first compressed message and at least one of the subsequent compressed massages are received from two different devices.

15. The method of claim 12 further comprising generating an uncompressed message for processing by the first device from the new message template that includes the delta.

16. The method of claim 1, wherein determining, based on the stored indications, that the first delta was received in accordance with at least one threshold factor comprises comparing deltas from a first device delta storage by a first device template delta processing function.

17. The method of claim 1, wherein determining, based on the stored indications, that the first delta was received in accordance with at least one threshold factor comprises storing the first delta in a first device delta storage for reference by a first device template delta processing function.

18. A system for updating a message template comprising:
a processing device, memory, and interface coupled to:
detect a first compressed message that includes a first delta and a template index that references a first message template, wherein the first delta is combinable with the first message template to reconstruct an uncompressed message and wherein the first delta corresponds to an extraction of the first message template from the original uncompressed message;
retrieve, from the memory, the first message template based on the template index;
store, in the memory, an indication of having received the first delta;
receive at least one subsequent compressed message that includes the first delta and that references the first message template, and storing an indication of each subsequent time the first delta is received;
determine, based on the stored indications, that the first delta was received in accordance with at least one threshold factor, and in response thereto, initiating a procedure to generate a superseding message template, which updates the first message template by including the first delta.

19. The system of claim 18, wherein the system comprises a server device or a client device.

20. A non-transitory computer-readable storage element having a computer readable code stored thereon for programming a computer to perform a method for updating a message template based on receiving a plurality of common deltas, the method comprising:
detecting a first compressed message that includes a first delta and a template index that references a first message template, wherein the first delta is combinable with the first message template to reconstruct an uncompressed message and wherein the first delta corresponds to an extraction of the first message template from the original uncompressed message;
retrieving the first message template based on the template index;
storing an indication of having received the first delta;
receiving at least one subsequent compressed message that includes the first delta and that references the first message template, and storing an indication of each subsequent time the first delta is received;
determining, based on the stored indications, that the first delta was received in accordance with at least one threshold factor, and in response thereto, initiating a procedure to generate a superseding message template, which updates the first message template by including the first delta.

* * * * *